Dec. 19, 1967     G. S. GABRIEL ET AL     3,358,649

ANIMAL CAGE LID

Filed Aug. 8, 1966     2 Sheets-Sheet 1

INVENTORS
GEORGE S. GABRIEL
DOUGLAS J. ANDERSON
BY
Kane, Dalsimer, Kane & Smith
ATTORNEYS Dec. 19, 1967  G. S. GABRIEL ET AL  3,358,649
ANIMAL CAGE LID
Filed Aug. 8, 1966  2 Sheets-Sheet 2
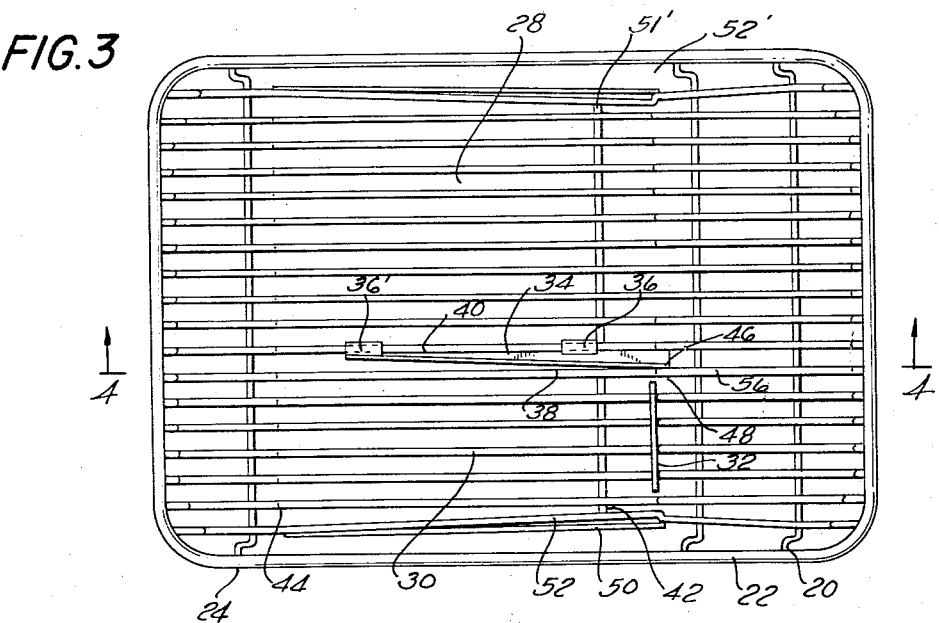
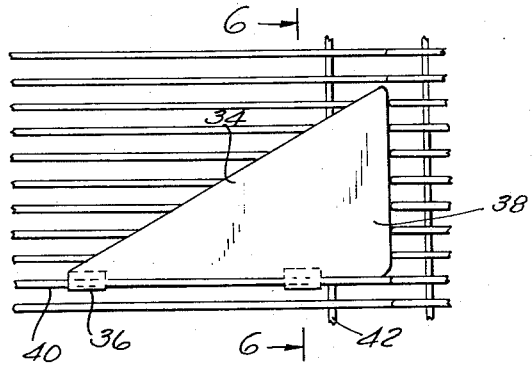
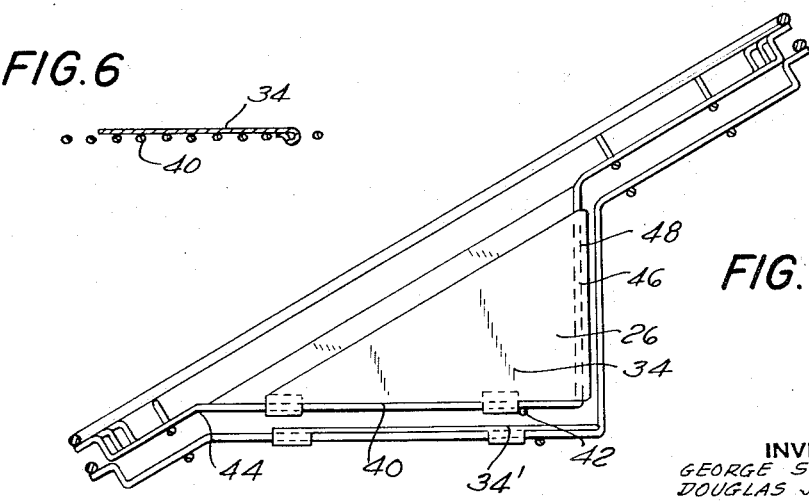
INVENTORS
GEORGE S. GABRIEL
DOUGLAS J. ANDERSON
BY
Kane, Dalsimer, Kane & Smith
ATTORNEYS ANIMAL CAGE LID
George S. Gabriel, Westchester, and Douglas J. Anderson, Avondale, Pa., assignors to Lab Cages, Inc., Hackensack, N.J., a corporation of New York
Filed Aug. 8, 1966, Ser. No. 570,970
8 Claims. (Cl. 119—18)

This invention relates to animal cages and more particularly to a nestable animal cage lid with a collapsible divider partition.

An ever increasing need and use of experimental animals has developed in recent years. These animals are used for research and experimental as well as educational uses. Thus, many millions of mice, hamsters and guinea pigs are being studied and experimented with in laboratories throughout the world. Along with the increase in the number of animals being used, there has been a corresponding increase in the number of cages used to confine these animals. This increase has necessitated the dedication of large spaces for the storage and shipment of cages, trays and other accessories used in confining such animals.

One of the most common methods of confining laboratory animals is to place them in a cage consisting of a tray covered by a lid made up of a grid of straight spaced bars. The lid is so shaped as to contain hoppers for the storage of food and water which are easily accessible to the animals confined within the tray and which may be filled from without the tray. Because of the danger of water decomposing food in the form of pellets, and also, of food particles clogging the nipple of a bottle containing the water, it is desirous to separate the food and water supplies. This is most easily accomplished by a divider panel between the two compartments.

The requirement of a divider separating the food and water compartments of animal cage lids has created several problems with respect to the shipping, storage, cleaning and sterilization of such lids.

The typical prior art lid employed a rigidly attached divider. However, the location and projection of the divider prevented the nesting of such lids. Attempts have been made to solve this nesting problem, such as that disclosed in U.S. Patent No. 3,256,859 granted on June 21, 1966, but all sacrificed the structural integrity of the lid and weakened the lid construction to the extent that serious failure problems have been encountered in the field.

It is, therefore, a principal object of this invention to provide an animal cage lid with a divider which effectively separates the food and water compartments, but which can be folded and collapsed out of the way for storage, shipping and sterilization purposes.

This and other objects and advantages are most effectively attained by providing a standard cage having a tray for animals with a lid or cover so formed as to define a chamber for food and water with a collapsible partition between the food and water compartments. This partition is affixed to the cover but swings away to a more convenient position for easy storage. In this manner, one lid may easily be nested with another, thereby to facilitate storage, shipping and sterilization.

In accordance with the disclosed embodiment, the partition may be hinged to the lid by providing it with tabs which would wrap around one of the bars comprising a part of the lid. This would permit the partition to pivot about that bar from a colapsed to an erect position. The partition would be slidable along the bar and hence could engage an upright portion of the bar for supporting means when the partition is in an erect position. The sides of the lid can be tapered so as to further facilitate nesting. This would also serve to reduce the danger of animals getting wedged between the tray and the lid. A somewhat preferred embodiment has the chamber for food and liquid formed of bars bent at right angles. In this instance, the hinged partition, which straddles one leg of a right angle, can be supported in an upright position by engaging a bar perpendicular to the bar on which it is mounted. Reference is now made to the drawings which illustrate this preferred embodiment of the invention and in which:

FIG. 3 is a top plan view showing the divider erect and showing the outside bars tapered inwardly so as to permit the nesting of one lid within another of similar design;

FIG. 4 is a sectional view along line 4—4 of FIG. 3, showing two such animal cage lids, one nesting within the other;

FIG. 5 is a fragmentary plan view showing the divider in a collapsed position;

FIG. 6 is a fragmentary sectional view along line 6—6 of FIG. 5 showing the divider in a collapsed position.

Figure 1:
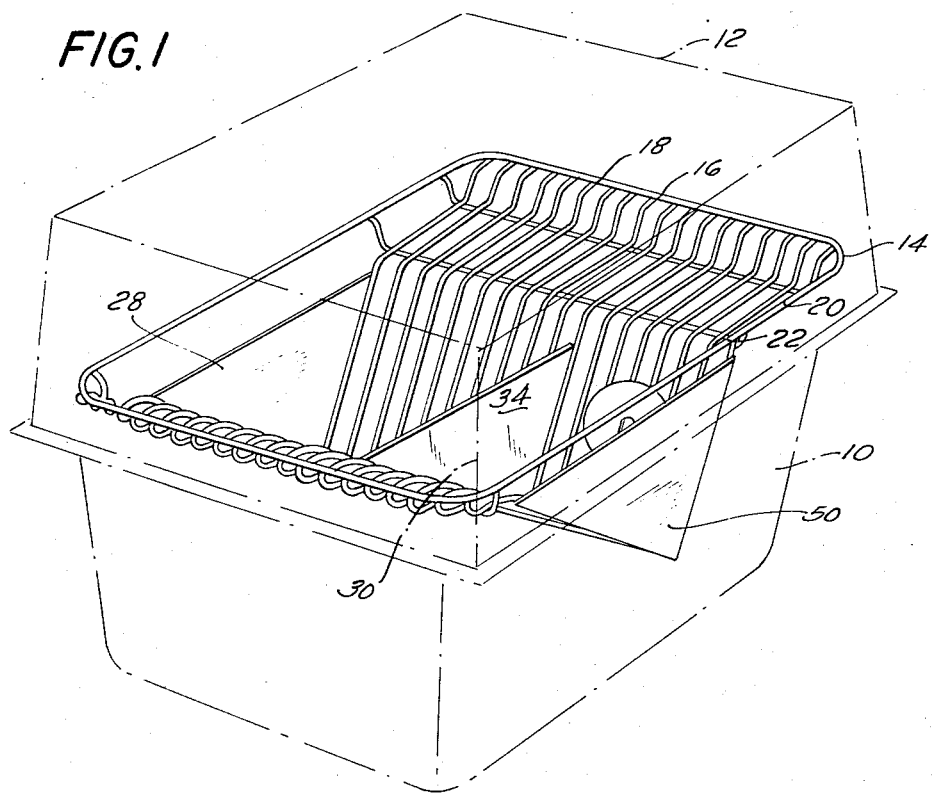
FIG. 1 is a perspective view of an animal cage lid in accordance with the invention showing the tray and a filter cover in phantom.

Reference is now made to FIG. 1 in particular, wherein an animal cage is shown as including a tray 10. This tray is ordinarily equipped with bedding and the like to sustain a number of contained animals. A filter cover 12 is also provided to fit over the tray and thereby protect the animals from germs, viruses and other airborne matter.

Turning now to the lid 16 incorporating the subject of this invention wherein it will be appreciated that it is designed to fit into the tray 10 and provide a convenient means for feeding and watering the animals contained therein and at the same time to be easily cleaned and stored when not in use. Accordingly, the lid 16 includes an outer rim 14 from which longitudinal bars 18 are suspended. The longitudinal bars 18 are kept in a spaced relationship by transverse bars 20, 22 and 24, which are also firmly affixed to the outer rim 14 as exemplified by FIG. 3.

The longitudinal bars 18 are so shaped as to form a depressed chamber 26, comprising a frontal wall 48 and base portion 54, best seen in FIG. 4.

Solid side panels 50 and 50' are firmly attached to the sidemost bars 52 and 52' which are inwardly bent so as to cause the side panels 50 and 50' to taper inwardly and downwardly, thus allowing the nesting of one such lid within another, as shown in FIG. 4.

The chamber 26 is subdivided by a divider 34 into two compartments comprising a food hopper 28 and watering bottle compartment 30. A bottle support 32 is provided in the watering bottle compartment 30 to hold the bottle nipple firmly in place and thereby prevent the entrapped animals from pushing the bottle into the back of the compartment 30 and out of reach.

The divider 34 is designed and disposed to effectively separate the food hopper 28 and water bottle compartment 30 and at the same time be collapsible for easy storage, shipping and cleaning. In this manner the food pellets will remain dry and the water bottle nipple will not be clogged by food particles.

Figure 2:
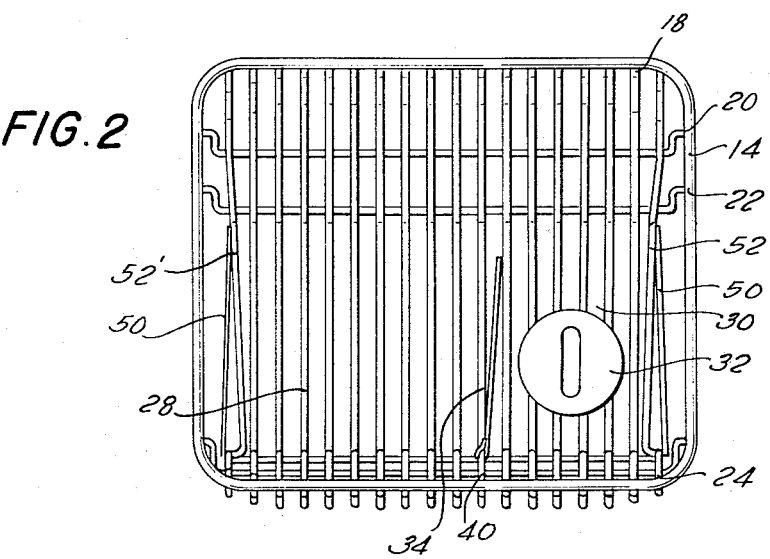
FIG. 2 is an end elevation showing the divider partition in the upright position.

In order to conserve space in the transit and storage of such lids and also within the machinery used to cleanse and sterilize such lids, the divider is adapted to be shifted from the upright position to a collapsed position. Accordingly, the divider includes two tabs 36 and 36', which are firmly affixed to the dividing panel 38. The tabs 36 and 36' circumscribe a longitudinal guide bar 40 which comprises a part of the base portion 54 with sufficient play so as to allow the dividing panel 38 to pivot between the collapsed position, as shown in FIG. 5 and FIG. 6, and the erect position shown in FIG. 2 and FIG. 3. At the same time, the divider 34 is free to be longitudinally displaced along the guide bar 40 between the limits described by the transverse stopping bar 42 and the angular bend 44 in the guide bar 40, as suggested by FIG. 4. In this manner, the leading edge of the divider 46 may be engaged with the supporting bar 56 of the frontal wall 48 of the depressed chamber 26 for supporting purposes when the divider is longitudinally disposed to its foremost position. The transverse stopping bar 42 controls the extent of protrusion of the leading edge of the divider 46 beyond the frontal wall 48 and into the cage.

Thus, in the erect position, the dividing panel 34 serves to separate the food pellets and water bottle placed in their respective chambers. For shipping and storage purposes, the divider 34 may be disengaged from the supporting bar 56 by sliding it back along the guide bar 40. Gravity will then cause the divider to collapse to the position shown in FIGS. 5 and 6. With their divider panels in this position, a multiplicity may be stacked one inside another as exemplified by FIG. 4.

Thus, among others, the several aforementioned objects and advantages are most effectively attained.

Although only one preferred embodiment of the invention has been disclosed and described in detail herein, it should be understood that the invention is in no sense limited thereby and its scope is to be determined by the appended claims.

We claim:
1. An animal cage lid comprising: a multiplicity of interconnected transverse bars and downwardly and upwardly sloping longitudinal bars defining a chamber including at least one intermediate bar interposed between two adjacent longitudinal bars on opposite sides thereof; collapsible means associated with said bars for selectively compartmentalizing said chamber including at least one divider panel; hinge means coupled to one edge of said panel, said hinge means pivotally and slideably mounted to said intermediate bar whereby said divider panel is adapted to pivot between an upright position projecting away from said bars at which position said divider compartmentalizes said chamber and a collapsed position at which said divider rests against the bars wherein said chamber is free from protrusions when said collapsible means assumes a collapsed position whereby said cage lid is adapted to receive another such lid in a stacked relationship; and, supporting means including at least one of said two adjacent bars cooperating with said intermediate bar in supporting said panel in an upright position when portions of said panel are therebetween.

2. The invention in accordance with claim 1 wherein said multiplicity of interconnected longitudinal and transverse bars terminate and are affixed to a rim, said longitudinal bars being of the same irregular shape so as to define a depressed portion recessed from said rim, said depressed portion being enclosed by end panels affixed to the sidemost longitudinal bars so as to form a chamber.

3. The invention in accordance with claim 2 wherein the sidemost longitudinal bars are inwardly bent so as to cause an inward and downward taper to said end panels, thereby permitting the stacking of a multiplicity of such animal cage lids one within another.

4. The invention in accordance with claim 1 wherein said hinge means are provided for permitting the divider panel to be longitudinally shifted on the bar between a locked position at which it is adapted to remain upright and a second position at which it is free to be collapsed.

5. The invention in accordance with claim 1, wherein said slideably mounted hinging means comprises tab portions extending from said divider panel, said tab portion circumscribing about said longitudinal bar so as to allow said divider panel to pivot about said longitudinal bar and be displaced longitudinally along a portion of said bar.

6. The invention in accordance with claim 1 wherein stop means including a transverse bar limits the longitudinal displacement of said divider panel.

7. The invention in accordance with claim 1 wherein said divider panel corresponds in configuration to the cross sectional shape of said compartment.

8. An animal cage lid comprising: a multiplicity of interconnected transverse bars and downwardly and upwardly sloping longitudinal bars defining a chamber including at least one intermediate bar interposed between two adjacent longitudinal bars on opposite sides thereof; collapsible means associated with said bars for selectively compartmentalizing said chamber including at least one divider panel; hinge means coupled to one edge of said panel, said hinge means pivotally mounted to said intermediate bar whereby said divider panel is adapted to pivot between an upright position projecting away from said bars at which position said divider compartmentalizes said chamber and a collapsed position at which said divider rests against the bars wherein said chamber is free from protrusions when said collapsible means assumes a collapsed position whereby said cage lid is adapted to receive another such lid in a stacked relationship; and, supporting means including at least one of said two adjacent bars cooperating with said intermediate bar in supporting said panel in an upright position.

References Cited
UNITED STATES PATENTS

| | | | |
|---|---|---|---|
| 1,157,045 | 10/1915 | Risher | 220—22 |
| 3,117,688 | 1/1964 | Walstad et al. | 217—7 |
| 3,117,692 | 1/1964 | Carpenter et al. | 220—60 |
| 3,256,859 | 6/1966 | Petit | 119—18 |

HUGH R. CHAMBLEE, *Primary Examiner.*

SAMUEL KOREN, *Examiner.*